Patented Feb. 15, 1949

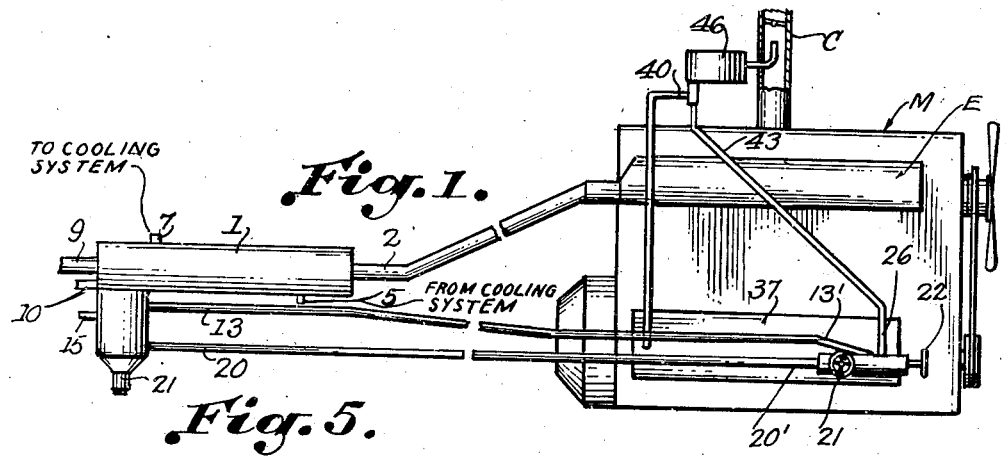
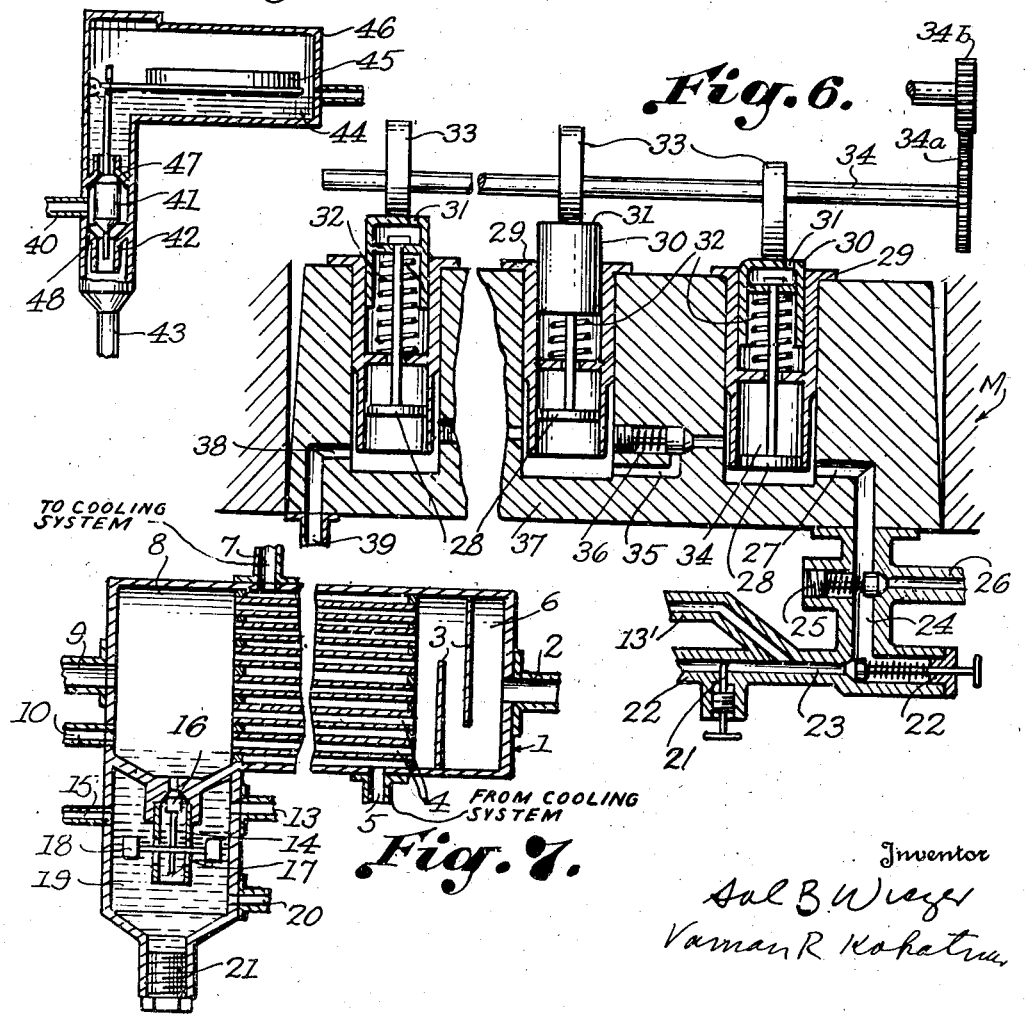

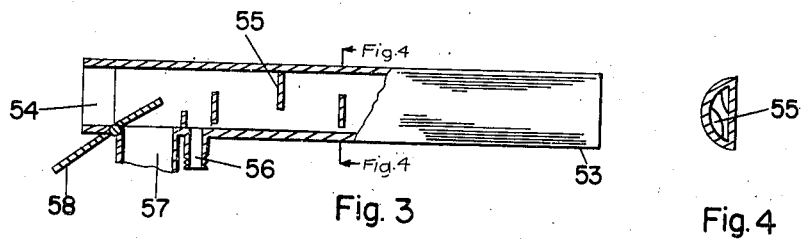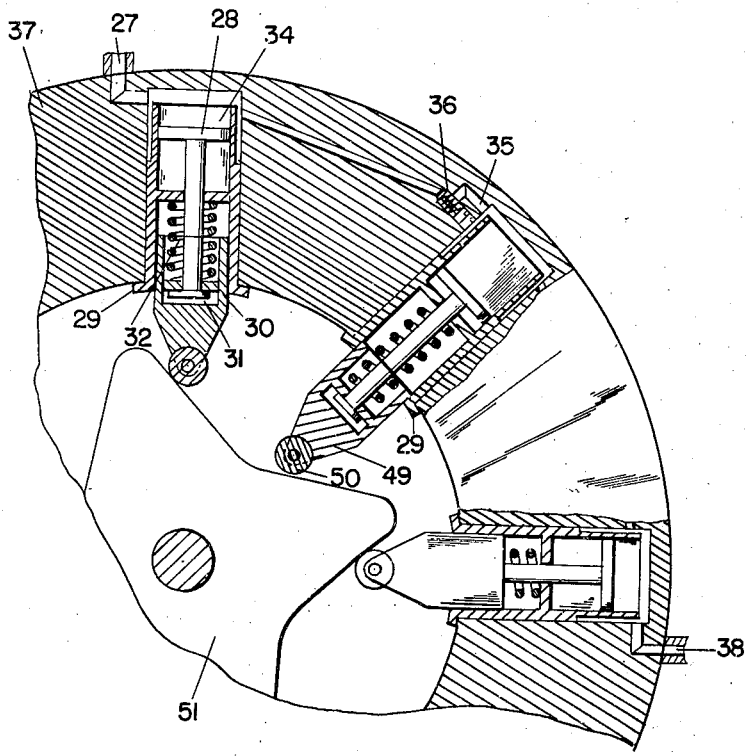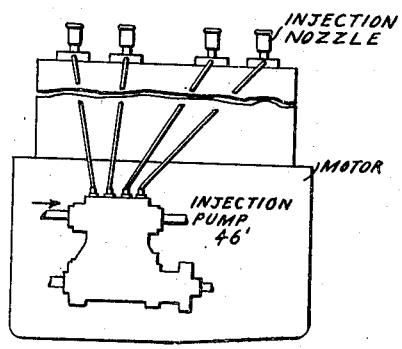

2,461,580

UNITED STATES PATENT OFFICE 2,461,580

METHOD AND APPARATUS FOR EMULSIFYING FUELS

Sol B. Wiczer, Washington, D. C., and Vaman R. Kokatnur, New York, N. Y.

Application January 28, 1944, Serial No. 520,098

10 Claims. (Cl. 123—25)

The present invention relates to a method and apparatus combined with an internal combustion engine to homogenize non-homogeneous substances comprising the fuel thereof whereby to improve various fuels, particularly the efficiency thereof in burning the same as a homogeneous emulsion or suspension of otherwise immiscible or unstable mixtures or suspensions.

It is an object of the invention, therefore, to provide a method and apparatus whereby a non-homogeneous mixture of various non-homogeneous fuels is homogenized by the engine prior to immediate use as a fuel thus enabling use of various immiscible mixtures, unstable suspensions or dispersions as fuel.

It is a further object to provide a method and apparatus whereby water for emulsification with the fuel may be obtained by condensation from the exhaust gases.

Many advantages are known for mixtures of such fuels as alcohols with hydrocarbons such as gasoline and benzene.

These fuels are not miscible at all temperatures or at all proportions. Much work has been done to stabilize such mixtures with common solvents but this increases the expense and does not solve the difficulty of storage at all temperatures. According to the present invention one or more fuel tanks full of gasoline and alcohol or a mixture, whether dissolved or not, would be passed thru a motor operated homogenizer.

Similarly it is possible by taking two immiscible fuel bodies and by controlling the quality of one of them, the outer or continuous phase, any kind of fuel could be made the inner or disperse phase since the combustion characteristics, the knocking or ignition delaying tendency of a fuel is largely controlled by the phase in immediate contact with the combustion air which, besides the volatile constituents, would comprise the continuous phase of the liquid particles in the cylinders. Thus it would be possible with our system to supply both a good fuel and a poor fuel to the engine homogenizer, together if desired with a small quantity of emulsifying agent which may be premixed in one of the fuels.

In another aspect where fuel has remained in storage for some time an immiscible layer of water settles out and often gives trouble in the carburetor.

While the invention contemplates liquid fuels it is possible by the present invention to suspend solid fuels, or homogenize gummy or tarry heavy ends in certain types of engines.

It is known that combustion engine efficiency and overall mileage can be improved by addition to the fuel of water and still more efficiently when the water is dispersed in the fuel as an emulsion wherein the water is the internal phase. See U. S. Patents 2,111,100, 2,152,196 and Industrial & Engineering Chemistry, vol. 34 (1942) pages 575–580. The quantity of water varies and may be use in any quantity up to 50%, quantities in the range of 25–40% being preferred.

Primary disadvantages of the use of emulsified fuel have been public resistance to use of a milky colloidal mixture where it has been accustomed to use water white liquid fuels; an inherent distrust of placing free water in the fuel tanks; possible instability of preformed emulsions over long storage periods; and in the case of air craft particularly the disadvantage of transporting large quantities of water which is heavier than an equivalent volume of fuel.

According to the present invention, no preformed emulsion is made, the water and gasoline or other hydrocarbon fuel are emulsified by a homogenizer forming an integral part of and operated by the engine itself as the emulsion is used.

Moreover as part of the present invention a system is designed whereby part of the water content of the exhaust gases is condensed and recycled to the fuel homogenizer for emulsification with more fuel.

In the drawings, Figure 1 shows a complete condensing and emulsifying system particularly for water cooled engines usually having pistons in line.

Figure 2 shows the construction of an emulsifying device primarily for use with radial engines.

Figure 3 is modified single condenser tube for air cooling.

Figure 4 is a side view of the condenser tube of Figure 3 taken on the line 4—4 of Figure 3.

Figure 5 is a detailed section in elevation of a float controlled chamber for storing emulsified fuel for feed to a carburetor or as integral construction as a portion of a carburetor.

Figure 6 is a detailed section in plan of a homogenizer with chambers lineally disposed.

Figure 7 is a detailed section in elevation of a liquid cooled exhaust condenser and auxiliary fuel tank for storing both fuel drawn from the fuel tank and condensed liquid supplied by the exhaust condenser.

Figure 8 shows diagrammatically as an alternate detail, the use of a conventional fuel injection pump instead of the carburetor to supply the emulsified fuel to the engine.

Referring to Figure 1, all of the essential units of a homogenizing system and water condensation system partly diagrammatic are shown. A motor M of the typical water cooled type with cylinders lineally arranged having a carburetor 46 with air intake C and exhaust manifold E is shown to illustrate a general arrangement with an exhaust condenser 1 and emulsifier 37 positioned in the side of the motor to be operated from the camshaft 34 (Figure 6) driven by the motor thru the usual timing gear 34a and crank shaft gear 34b attached to the end of the crank shaft (not shown). The arrangement of Figure 1 also includes diagrammatically interconnecting piping to show an arrangement of the several units of this invention with the motor, exhaust and carburetor, but it will be understood that various other constructions will serve the purposes of this invention as hereinafter explained. The system is useful for any type of internal combustion engine attached to land, air or sea craft. Sufficient details only for operation of the system are given and it will be understood that some parts would be supplemented by standard construction for analogous devices and for the particular engine and service in which it is to be used.

The quantity of water condensed would vary with that desired and to this end the cooling capacity of the condenser would be designed. In general, only a fraction of the total exhaust gases would need to be cooled. The condenser comprises a cylindrical shell 1 closed at both ends except for inlet and outlet exhaust gas pipes 2 and 9. The exhaust gas from the motor M and exhaust manifold E enters thru pipe 2, is deflected by baffles 3 in ante-chamber 6. The exhaust gases are divided into a plurality of streams thru small tubes 4 and pass thru to an after chamber 8 and out thru pipe 9. Pipes 4 are cooled by water circulating around them in the central part of the condenser, the water coming as by-pass from cooling system of the engine (not shown) entering the condenser thru 5 and leaving at 7 after having cooled the exhaust gases sufficient to condense the water vapor therein. The water drips to the bottom of the after chamber 8 into a conical recess. Any excess water is allowed to drip out thru a pipe 10 and is discarded by the system.

Beneath the conical depression of the exhaust condenser is fitted an auxiliary fuel tank in which both water and fuel are stored in regulated quantities. The function of this auxiliary tank is to allow an accumulation of a fixed quantity of gasoline and water to be fed to the emulsifier. The water accumulated here represents a modifying supply to keep the flow of water and gasoline to the emulsifier in relatively constant quantity and to overcome the irregular water supply due to irregular operation of the motor or other causes. Another purpose is to provide for immediate contact of the water with the fuel to extract therefrom part of the emulsifying agent therein which facilitates subsequent emulsification and also renders the water immediately anti freeze which is one of the properties of the emulsifying agent. An additional function is to return any unburned fuel that may have condensed with the water to the fuel supply.

The water passes into the chamber thru a valved hole in the apex of the cone, which is opened and closed by a needle valve 16 operated by float 18 composed of porous material adjusted in gravity to float on water but not in oil (gasoline). The float is disposed around a tube 14, which supports the same and directs the vertical movement of the float. The tube 14 has vertical slots 17 cut a short distance thru which a cross bar operating from the float attaches to the needle valve and also fixes the orbit of the float to simple vertical movement. The height of the float and water 19, is controlled by the length of the needle valve. The lower end of the slot 17 retains the float so that it need not descend far below the open position of the valve 16. The tube 14 may be of any suitable length and besides supporting the float serves to prevent any water from being entrained in the gasoline 12, which enters the auxiliary tank at 15 from the fuel tank (not shown) and is withdrawn at 13 by the suction of the emulsifier and floats above the water collecting below in layers. The water is withdrawn at 20.

Regulated quantities of water and gasoline containing emulsifying agent such as described in the above mentioned patents, for example ammonium oleate and other compounds mentioned hereinafter withdrawn thru pipes 20 and 13 from the tank 11 are delivered to the emulsifier, as shown.

The emulsifier shown in the drawing by 37 is a single pumping unit bolted into the side of the motor M at the level of the cam shaft according to standard construction, which operates push rods of poppet valves as is conventional. The cam shaft is driven by a timing gear 34a in turn driven conventionally by the crankshaft gear 34b at one end and contains a number of cams 33 corresponding to the number of poppet valves two for each cylinder in the motor. The emulsifier shown comprises any desired number of pistons 28 (not more than the number of cams present). Each piston is actuated by the cam operating against a cup 30 having vents 31 to equalize air pressure behind the cup and piston. The cup is caused to follow the cam by the pressure of a spring 32 retained between shoulders of the cup 30 at one end and projections of the cylinder insert 29 at the other. The piston is attached to the cup 30 by means of a retaining washer and spring seat in a manner similar to an ordinary poppet valve.

The cylinder insert 29 is tapered at the emulsion chamber end to allow the fuel to circulate around it and completely flow thru the cylinder independent of any action of the piston. The cylinder insert 29 is fitted into the cylinder chamber shown as a smooth fit but it may be threaded if desired. According to the construction a whole cylinder insert 29 may be removed together with piston spring and cup as a unit.

The fuel emulsion flows thru ducts 35 progressively from one pumping unit to the next and is continuously subjected to great pressure and agitated by the action of the pistons, the friction of the ducts and pressure of the valves each acting to effect a complete emulsion. Moreover the emulsifying system is designed to pump fuel emulsion faster than it is used and is continuously recycled thru the emulsifier thus ensuring a very homogeneous emulsion.

Each duct 35 between cylinders of the emulsifier have a spring operated check valve 36, whose tension may be adjusted with a set screw, which maintains the ducts closed except under forward pressure of the fuel, and prevents the emulsion from returning, thus ensuring the steady rapid flow in a single direction. The emulsion leaves the last cylinder thru duct 38 traveling thru pipe 39 to the carburetor 46, or the Diesel pump 46' in the case of a fuel injection engine.

The carburetor 46 and the fuel injection pump 46' are of standard construction and are only shown as to such features as air intake C and fuel feed thereto and more specifically. The carburetor 46 illustrates details of fuel supply 44 to a float chamber, containing a float 45. The fuel enters at 40 thru a valve operated by the float 45. In the valve chamber is a float valve 41 conical at both ends to direct the fuel first into the float chamber 44 thru the upper conical opening 47. When this is open, the float 45 is depressed and the valve 41 rests on the lower conical shoulder 48 closing the vent 42. When sufficient fuel has entered the float chamber 44, the float 45 will raise the valve 41 closing the entrance 47 shutting off the fuel supply thereto and, simultaneously opening vent 42 directing the fuel emulsion into pipe 43 thru which it is returned to the emulsifier as a by-pass. The by-passed fuel enters the emulsifier thru duct 26 controlled by a spring check valve 27 and thus into duct 27 in response both to the suction of piston 28 and the pressure in line 39.

Thus the feed into the emulsifier is primarily recycled fuel emulsion from lines 43 and 26 thru valve 25, but as the pressure in line 43 is reduced by consumption of the fuel in the carburetor, spring valve 22 will open under suction of the piston 28 allowing fresh water and oil to be fed to the emulsifier thru duct 24. The gasoline and water enter from the auxiliary tank thru line 23. A needle valve 21 is fixed in the water duct 20 to carefully adjust the ratio of water to gasoline.

The fuel for aviation use would comprise a good gasoline of about 90 to 100 plus octane and would contain emulsifying agents of the water-in-oil type. Strongly basic soaps or amines such as ammonia, ammonium oleate, tri-ethanol amine, morpholine etc., are desirable because in contact with the water in auxiliary tank 11 a certain amount of these substances would dissolve in the water and render it non-freezing at low temperatures.

Figure 2 shows a modified homogenizer having all of the pistons mounted radially for operation by a single cam. While either type of homogenizer may, by mounting for operation upon a separate shaft suitably geared to the engine, be used with any type of motor, that is, either a motor having pistons arranged in line or one whose pistons are radial, the homogenizer for Figure 2, radially constructed, is particularly adapted for direct operation off the crank shaft and thus may be built into and become more integrally a part of either a radial or, by end-mounting, lineal piston engine, while the homogenizer of Figure 6 is more particularly adapted for being built into and become an integral part of the construction of a lineal engine. The construction of the radial homogenizer is similar in principle to that of the lineal, and like numbers have been used thereon to indicate like parts. In the construction shown, a block of 8 homogenizing pistons are mounted radially, the drawing being broken away to show details of 3 thereof, which are exactly of the same construction as Figure 6, but shows particularly the relative positions when 8 are radially mounted for operation by a 4 lobed cam. With this construction adjacent homogenizer pistons are reciprocating in opposite directions to give maximum homogenization. Thus, while one piston is exhausting its charge the adjacent is intaking. Check valves in the lines control the flow radially from piston to piston as in the lineal homogenizer. As indicated, this figure besides radial construction has all of the pistons operated from a single epicycloidal cam driven from a central shaft which may be desirably the crank shaft or an extension thereof of a radial engine, but obviously may be any shaft geared to the crank shaft of an engine of any other type. A further modification of the homogenizer construction shown in Figure 6 is in the use of rollers 50 attached to a tapered body 49 at the bottom of the cup construction 30 which is otherwise similar to the cup construction of Figure 6, thus allowing easier oscillation of the pistons by the cam 51 through the rollers 50. While similar to the lineal homogenizer the liquids would pass radially around the circuit in series from cylinder to cylinder, it is possible to take off the homogenized fuel at some intermediate point as shown. This homogenizer would be piped up in the fuel circuit similar to the lineal homogenizer if used in an exhaust gas condensing system.

Figure 3 shows a single tube of a modified condenser adapted to operate by air cooling. This tube may be merely one or one of a series depending on how much cooling is necessary adapted to lie in or against the skin of an airplane and conduct the exhaust gases or a portion thereof in heat exchange relation to the air. The exact shape of the tube is merely exemplary, any streamlined contour may be adapted which will give minimum air resistance and, if desired, primary heat transfer to the ship's skin may be thru the flat surface. Thus the air cooled exhaust condenser in the surface of the plane's skin may be merely a series of tubes formed by a corrugated plate and a flat plate forming the ship's skin and dividing or closing the corrugations into a series of parallel tubes. The number of tubes will depend on the amount of exhaust gas to be cooled, and the normal type and flight conditions of the plane. The exhaust gases to be cooled may be passed thru the tubes in parallel by dividing the flow from a header thru all the tubes, but it is preferred as shown in Figure 3 to lead the gases in series from one to the next to allow a greater degree of cooling control to short circuit the system at any point where adequate cooling has been obtained and thus prevent freezing of the condensate by supercooling.

As shown in the figure the tube body 53 may be a single tube through which the gases flow and are exhausted through the end 54 and by any damper, valve or gate mechanism 58 may be diverted for additional cooling through other tubes attached to 57. Thus the desired cooling surface may be obtained by suitable valve control. The tubes may be fitted with baffles 55 to obtain maximum turbulence and cooling effect of the walls. Condensed water may be withdrawn through pipe 56 and led to the auxliary storage tank, as shown in Figure 1. Figure 4, an end view of the tube, indicates a useful shape of the tube and desirable arrangement of baffles 55 therein. It will be understood however, that any other desirable shapes of tubing may be used for air cooling.

It will be appreciated that the homogenizer and associated valves and piping while continuously moving the fuel forward and subjecting the mixture to high pressures under great turbulence to homogenize the same, simultaneously acts as a pump to move the fuel not only from one piston to the next but forward to the carburetor and to the recycling line. However it may be desirable to use additional pumps and other fuel transfer and control devices as may be present in conventional engine design.

The auxiliary fuel supply and mixing tank may be mounted at any position on the vehicle, even inside thereof for visible control to observe proper operation and adequate supply of both constituents of the liquids to be homogenized. Moreover it may be desirable to use the auxiliary supply and mixing tank even when nonhomogeneous fuels are used without water condensation from the exhaust, that is where both constituents of the mixture to be homogenized are carried in the fuel tanks. Where the fuel may be carried as a mixture in the tanks which is sufficiently homogeneous to be supplied to the homogenizer in fairly well fixed proportions it is possible to dispense with the auxiliary supply and mixing tank. Moreover other types of devices capable of supplying relatively accurate proportions of fuel constituents to the homogenizer such as independently controllable proportioning pumps or valves may be substituted for the auxiliary supply and mixing tank. Such substitute devices may be particularly desirable where non homogeneous fuels other than water are used.

*Example 1*

Assuming a mixture of iso octane and water of 2 molecules of water per molecule of fuel, a ratio about 31% of water by weight in the fuel mixture, and an air fuel ratio of about 15 to 1, for 100 pounds of fuel, the exhaust gases would weigh 1631 pounds of which about 10% is water vapor or 163 pounds. For recovering or recycling 31 pounds of this water to the next 100 pounds of fuel, only 19% of the exhaust gases would need to be cooled. However, assuming a degree of inefficiency of recovery, the quantity of exhaust gases to be cooled may be accepted as 25%, or 407 pounds of exhaust gases per hour. Assuming specific heat at about .35 and an exhaust gas temperature of 1200° F., it would require for cooling to condensation temperature of about 50° F. including the latent heat of the water a little less than 200,000 B. t. u./hr.

Substituting this in the standard heat transfer equation $$Q = \frac{KADt}{L}$$

Where

Q is the total heat exchange
K is the heat conductivity coefficient of the condenser wall and varies widely for metals with copper at one extreme of 215 and aluminum intermediate at 120 and tantalum and ferrous metals at about 30 in B. t. u. per sq. ft. per degree Fahrenheit per lineal foot per hour.
Dt is the temperature range of the gases being cooled in degrees F.
L is the thickness of the condenser wall in ft. assumed to be ¼ inch.
A is area in sq. ft. of cooling surface $$200{,}000 = \frac{215 \times (1200-50) A}{\frac{1/4}{12}}$$

A=.02 sq. ft. for copper
A=.12 sq. ft. for tantalum or iron.

It is not intended to offer these figures for any particular design. In general the efficiency of any condenser would vary with the air temperature and flow rate over the condenser surfaces, and with the type of metal used. For ordinary construction the heat conductivity varies with the thickness and temperature of the transfer. Moreover for the average air plane many times the exemplary quantity of fuel, 100 pounds per hour, would be consumed. Hence the calculations are not intended to fix or suggest dimension of the condenser, but only to show that variations of many thousand per cent of condenser capacity over these figures would still be a practical size for actual plane construction or other vehicle or ship powered by an internal combustion engine. In actual construction the system should resist corrosion of exhaust gas condensate water which may be acidic due to presence of some dissolved sulfurous gases. This will not continuously increase in concentration since only a fraction of the water content of the exhaust is recycled to the system. Such metals as tantalum, silicon iron and many well known alloys are suitably corrosion resistant.

*Example 2*

Alcohol and gasoline stored in separate tanks or as superimposed immiscible layers in a single fuel tank from which fuel is withdrawn simultaneously from both layers by one or more fuel pumps or by vacuum thru the auxiliary storage tank are fed directly to the homogenizer, from which it is fed to the carburetor and then to the engine. By use of suitable emulsifying agents such as ammonium oleate, the gasoline may be made the external phase. By use of lecithin or hydrophyllic colloids the alcohol will become the external phase. In general it is desirable to dissolve the emulsifying agent if one is used, in the liquid which is to become the continuous phase. Any of the lower alcohols such as methanol, ethanol or iso propanol may be used. Moreover the system may further be used with additional exhaust gas condensate according to Example 1.

*Example 3*

Kerosene immiscible oxidized hydrocarbon fractions boiling in the Diesel fuel range 350-700° F. or other oxygen containing kerosene immiscible oils such as fixed oils like castor to which polar type Diesel fuel primers have been added to build the oxidized oil up to any desired high cetane number is doped with emulsifying agent such as lecithin which would make the oxygenated fuel fraction the outer phase of an emulsion is thereafter fed to a Diesel engine operated fuel homogenizer together with a lower cetane number Diesel fuel such as a hydrocarbon fraction boiling in Diesel fuel range. The homogenized fuel is thus fed by conventional fuel injection to the engine. By this practice it is possible to make up a smaller proportion of a high cetane fuel and disperse therein large quantities of inferior Diesel fuel to burn the combination with the apparent desirable combustion characteristics of the continuous or outer phase. It is recognized that conventional primers such as peroxides, nitrates and sulfur compounds are polar and difficultly soluble in Diesel fuel. Not only will they more readily dissolve in the continuous oxygenated or polar phase, but by so dissolving will be substantially entirely concentrated in the continuous phase, so that when the fuel is burned the primer will have the effect of a greatly increased concentration.

Hence by the present homogenizing system it is possible to improve combustion efficiency by adding inert constituents to the disperse phase, by adding poor type hydrocarbon they may be burned for their calorific value while controlling the actual combustion characteristics of only the continuous phase. Moreover the present system enables one to burn a great variety of otherwise non-homogeneous fuels without prior stabilization.

Various fuel mixtures may be used herein and various modified structures may be used as will be apparent to one skilled in this art within the scope of the appended claims.

It will be understood herein that the fuels used are mixtures of liquids or suspensions of solids in liquids and the homogenization thereof is for the purpose of converting each liquid into homogeneous liquid form and is not concerned with the subsequent and independent carburetion thereof, a process of making a homogeneous gaseous mixture of the fuel with air for combustion.

We claim:

1. An internal combustion engine having a fuel emulsifier actuated thereby, means to supply a nonhomogeneous liquid in adjustably variable proportions as fuel mixture to the emulsifier, carburetor means to supply a homogeneous fuel mixture formed in the emulsifier to the engine and means to recycle excessive homogenous fuel to the emulsifier.

2. An internal combustion engine, having means to condense water from the exhaust gases, means to supply an adjustably fixed proportion of the condensed water and light liquid fuel immiscible therewith to an emulsifier actuated by the engine and means to feed a homogeneous emulsion suspended as a mist in a combustible proportion in air to the engine in engine operative quantity.

3. A water cooled internal combustion engine having an exhaust gas condenser operative by heat exchange from the cooling water to exhaust gas moisture condensing degree to condense water therefrom, means actuated by the engine to emulsify an adjustably fixed proportion of the condensed water with the water immiscible liquid fuel to form a homogeneous water-in-oil emulsion and carburetor means to supply an engine operative quantity thereof as a mist comprising particles of water surrounded by a film of combustible liquid suspended in a combustion supporting proportion of air to the engine.

4. An air cooled internal combustion engine of the high speed vehicle propelling type having an exhaust gas condenser capable of condensing water by heat exchange with cold air passed in heat exchange relation to the exhaust gases, means to supply the condensed water and immiscible light liquid fuel in adjustably fixed proportions to an emulsifier actuated by the engine and means to supply the emulsified fuel as a mist comprising particles of water surrounded by a film of liquid fuel suspended in a combustion supporting proportion of air to the engine in engine operative proportions.

5. In an internal combustion air craft engine means to condense water from the exhaust gases, means actuated by the engine to emulsify the water and fuel as a water-in-oil type of emulsion in adjustably fixed proportions and means to suspend a mist of said emulsion in supporting proportions in air in the engine.

6. Method of operating an internal combustion engine for high speed vehicle propulsion comprising condensing water from the exhaust gases, supplying an adjusted proportion of the condensed water with a liquid fuel of desirable ignition characteristics to an emulsifier actuated by the engine to form a water-in-oil type of emulsion, and operating the engine with at least part of said emulsion.

7. An internal combustion engine of the high speed land and air craft type, a supply combined therewith of liquid fuel comprising at least two immiscible liquids and means actuated by the engine for forming a homogeneous liquid emulsion of the fuels and means to atomize at least part of the emulsified fuel with air as formed to operate the engine therewith.

8. Internal combustion engine of the relatively high speed vehicle propelling type having a carburetor capable of mixing air and emulsified liquid fuel in combustible proportions, an emulsifier actuated by said engine, means to supply a plurality of immiscible liquids in adjustably fixed proportions to said emulsifier and means to feed emulsified liquid at atmospheric pressure to said carburetor.

9. In combination an exhaust gas condenser for internal combustion engines comprising a conduit for expanding and exposing hot exhaust gases from an engine to a cooling fluid in heat exchange relationship sufficient to condense at least a portion of the water vapor contained in said exhaust gases, an emulsifier adapted to be actuated by an engine and means to supply an adjustably fixed proportion of condensed water and immiscible liquid fuel to said emulsifier.

10. Internal combustion engine of a relatively high-speed vehicle propelling type, having a fuel injection type pump capable of injecting controlled quantities of liquid fuel to each cylinder of the engine in charge-forming proportions as the engine is operated, an emulsifier actuated by said engine, means to supply a plurality of immiscible liquids in adjustably fixed proportions to said emulsifier, and means to feed the emulsified liquid fuel at atmospheric pressure to said fuel injection pump.

SOL B. WICZER.
VAMAN R. KOKATNUR.

REFERENCES CITED

The following references are of record in the file of this patent:

UNITED STATES PATENTS

| Number | Name | Date |
|---|---|---|
| 1,376,201 | Harris | Apr. 26, 1921 |
| 1,419,239 | DuBrie | June 13, 1922 |
| 1,491,376 | Bochet | Apr. 22, 1924 |
| 1,611,429 | Fish | Dec. 21, 1926 |
| 1,896,387 | Woolson | Feb. 7, 1933 |
| 2,087,411 | Lundquist | July 20, 1937 |
| 2,115,228 | Lundquist | Apr. 26, 1938 |
| 2,221,405 | Nallinger | Nov. 12, 1940 |